US012704248B2

(12) United States Patent
Liu et al.

(10) Patent No.: US 12,704,248 B2
(45) Date of Patent: Aug. 11, 2026

(54) LIGHTING APPARATUS

(71) Applicant: LEEDARSON LIGHTING CO., LTD., Zhangzhou (CN)

(72) Inventors: Changzhu Liu, Zhangzhou (CN); Jianliang Lu, Zhangzhou (CN); Xiaowei Chen, Zhangzhou (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 0 days.

(21) Appl. No.: 18/999,909

(22) Filed: Dec. 23, 2024

(65) Prior Publication Data

US 2026/0117966 A1 Apr. 30, 2026

Related U.S. Application Data

(63) Continuation-in-part of application No. 18/210,044, filed on Jun. 14, 2023, now Pat. No. 12,213,222.

(51) Int. Cl.

| | |
|---|---|
| ***F21V 33/00*** | (2006.01) |
| ***F04D 25/08*** | (2006.01) |
| ***F04D 27/00*** | (2006.01) |
| ***F21S 8/06*** | (2006.01) |
| ***F21V 23/00*** | (2015.01) |
| ***F21V 23/02*** | (2006.01) |
| ***F21V 23/04*** | (2006.01) |
| ***F21Y 115/10*** | (2016.01) |
| ***H05B 45/325*** | (2020.01) |
| ***H05B 47/19*** | (2020.01) |

(52) U.S. Cl.

CPC ........ *F21V 33/0096* (2013.01); *F04D 25/088* (2013.01); *F04D 27/006* (2013.01); *F04D 27/007* (2013.01); *F04D 27/008* (2013.01); *F21S 8/063* (2013.01); *F21V 23/003* (2013.01); *F21V 23/02* (2013.01); *F21V 23/045* (2013.01); *H05B 45/325* (2020.01); *H05B 47/19* (2020.01); *F21Y 2115/10* (2016.08)

(58) Field of Classification Search

CPC .... F21V 33/0096; F21V 23/003; F21V 23/02; F21V 23/045; H05B 47/19; H05B 45/325; F04D 25/088; F04D 27/006; F04D 27/007; F04D 27/008; F21S 8/063

See application file for complete search history.

(56) References Cited

U.S. PATENT DOCUMENTS

| | | | | |
|---|---|---|---|---|
| 4,362,090 A * | 12/1982 | Whiteley | ................. | F24F 8/22 454/231 |
| 11,029,019 B1 * | 6/2021 | Bucher | ................. | F04D 27/007 |
| 11,523,488 B1 * | 12/2022 | Recker | ................. | H05B 45/56 |

(Continued)

*Primary Examiner* — Bryon T Gyllstrom

(74) *Attorney, Agent, or Firm* — LANWAY IPR SERVICES; Chun-Ming Shih

(57) ABSTRACT

A lighting apparatus includes a main controller, a fan driver module and a light driver module. The lighting apparatus is coupled to a wall switch. The wall switch is operated by a user to selectively send a wireless fan command a wireless light command to the main controller. The main controller translates the fan command to a fan control signal to the fan driver module. The fan driver module generates a fan driving current to a fan device. The main controller translates the light command to a light control signal to the light driver module. The light driver module generates a light driving current to a light source.

19 Claims, 13 Drawing Sheets

(56) References Cited

U.S. PATENT DOCUMENTS

| | | | | |
|---|---|---|---|---|
| 2011/0121654 | A1* | 5/2011 | Recker | H05B 47/19<br>307/64 |
| 2014/0266669 | A1* | 9/2014 | Fadell | G08B 19/00<br>340/501 |
| 2015/0370272 | A1* | 12/2015 | Reddy | G05B 17/02<br>700/278 |
| 2015/0382436 | A1* | 12/2015 | Kelly | H05B 47/19<br>315/131 |
| 2016/0047391 | A1* | 2/2016 | McPherson | F04D 25/0693<br>318/504 |
| 2017/0223807 | A1* | 8/2017 | Recker | H05B 47/115 |
| 2018/0324934 | A1* | 11/2018 | Wootton | H02J 13/00007 |
| 2022/0418065 | A1* | 12/2022 | Merck | H05B 47/19 |
| 2023/0111141 | A1* | 4/2023 | Skarda | F21V 23/009<br>362/85 |
| 2025/0071878 | A1* | 2/2025 | Lin | H05B 47/17 |

* cited by examiner

LIGHTING APPARATUS

RELATED APPLICATION

The present application is a continued-in-part application of Application No. U.S. Ser. No. 18/210,044.

FIELD

The present invention is related to a lighting apparatus, and more particularly related to a lighting apparatus with a flexible control.

BACKGROUND

The integration of LED devices with other systems, such as fans, has become a popular approach in enhancing convenience and functionality. These multifunctional devices provide the dual benefits of lighting and additional features like air circulation, making them attractive for both residential and commercial applications.

This combination offers users a streamlined experience by consolidating multiple functionalities into a single device. It reduces the need for separate installations, saving space and contributing to cleaner, more organized environments. The energy efficiency and long lifespan of LEDs make them an ideal candidate for such integrations, ensuring sustainability and reduced maintenance.

Despite these benefits, integrating multiple systems presents significant challenges. One common issue is the increased complexity of operation. Users may find it difficult to navigate multiple functions through a single control interface, especially if the system lacks intuitive design.

Installation complexity is another challenge that arises with multifunctional devices. Combining lighting and other features often requires specialized wiring or installation procedures, which may not be compatible with existing infrastructure. This can increase installation time and cost, making the adoption of these systems less straightforward.

Cost is also a significant factor when integrating LEDs with other devices. Multifunctional systems tend to be more expensive due to the additional components and engineering required. While the long-term savings from LED efficiency are notable, the higher upfront investment can be a deterrent for some users.

Reliability and maintenance are further concerns in integrated systems. When multiple functionalities are combined, the failure of one component can impact the entire device, complicating repairs and increasing downtime. This interconnected nature makes regular maintenance more challenging and potentially costlier.

Moreover, ensuring compatibility between the various systems within an integrated device requires careful design and testing. The seamless operation of lighting and other features, such as fan speeds or automation, depends on sophisticated control circuits that can detect and adapt to different user requirements. Any mismatch or failure in compatibility can lead to user dissatisfaction.

Another issue is adaptability to different environments and user preferences. While these devices aim to offer flexibility, the combination of features may not meet all needs or conditions. This can limit their appeal to users who prioritize specific functions over others.

The development and manufacturing of these multifunctional systems require collaboration across different engineering domains. This increases the complexity of product design and testing, potentially leading to longer development cycles and higher production costs. As a result, achieving a balance between functionality, cost, and usability remains a challenge.

While the integration of LEDs with other devices offers undeniable benefits, the associated challenges must be addressed to ensure wider adoption. By focusing on user-friendly designs, simplified installation processes, and cost-effective solutions, manufacturers can unlock the full potential of these innovative systems.

SUMMARY

In some embodiments, a lighting apparatus includes a main controller, a fan driver module and a light driver module. The lighting apparatus is coupled to a wall switch.

The wall switch is operated by a user to selectively send a wireless fan command a wireless light command to the main controller.

The main controller translates the fan command to a fan control signal to the fan driver module.

The fan driver module generates a fan driving current to a fan device.

The main controller translates the light command to a light control signal to the light driver module.

The light driver module generates a light driving current to a light source.

In some embodiments, the lighting apparatus may also include a AC-DC converter.

The AC-DC converter supplies power to the main controller, the fan driver module and the light driver module.

In some embodiments, the light source includes multiple LED modules.

The light control signal includes a ratio between sub-currents respectively supplied to the multiple LED modules.

The multiple LED modules have different parameters.

In some embodiments, the fan driver module includes a DC-DC converter.

The DC-DC converter is coupled to the AC-DC converter to generate the fan driving current.

In some embodiments, the main controller has a PWM circuit for splitting a first duty ratio of a first output power to the fan device and a second duty ratio of a second output power to the light source.

A sum of the first duty rain and the second duty ratio is 100%.

In some embodiments, a temperature sensor detects an operation temperature of the light source.

The main controller adjusts the fan control signal based on the operation temperature.

In some embodiments, the wall switch has a panel disposed a fan switch and a light switch respectively for generating the fan command the light command.

In some embodiments, the main controller is further connected to a secondary wall switch with a wire.

A series of on-off operation on the secondary wall switch is encoded as the light command the fan command to the main controller.

In some embodiments, the main controller generates an indication signal to the light control module for the light source to generate a visual signal corresponding to the fan device.

In some embodiments, when the fan control module detects an abnormal status of the fan device, the fan control module instructs the main controller to generate the indication signal.

In some embodiments, the fan device is configured to form an air flow tunnel

In some embodiments, a ultraviolet light source is disposed in the air flow tunnel to disinfect air in the air flow tunnel.

In some embodiments, a heater is disposed in the air flow tunnel to heat the air.

In some embodiments, a remote control sends a second fan command a second light command to the main controller.

In some embodiments, the remote control and the wall switch use different wireless protocols.

In some embodiments, the wall switch has a rotation base for rotating a transmitter to align with the direction of the main controller.

In some embodiments, the wall switch is attached on a traditional wall switch.

The wall switch gets power from the traditional wall switch.

In some embodiments, the traditional wall switch is connected to the main controller with a wire.

In some embodiments, the traditional wall switch only controls the light source.

In some embodiments, the light command the fan command is encoded with an identifier after the wall switch is matched with main controller.

In some embodiments, a lighting apparatus includes a first LED module, a second LED module, a rectifier, a power circuit, a time detector, a wall switch circuit and a controller.

The first LED module has a first light parameter.

The second LED module has a second light parameter.

The first light parameter is different from the second light parameter.

The rectifier converts an AC power to a DC power.

The power circuit converts the DC power to a first driving current and a second driving current respectively supplied to the first LED module and the second LED module.

The time detector detects a voltage time variation of the DC power.

The wall switch circuit is coupled to a wall switch mounted on a wall for converting an wall switch operation of the wall switch to a control signal.

The controller is coupled to the wall switch circuit and the time detector for determining whether to adjust a current ratio between the first driving current and the second driving current according both the voltage time variation and the control signal.

In some embodiments, if the voltage time variation is smaller than a predetermined time period, even the wall switch operation instructs a mixing adjustment to the controller, the controller ignores the wall switch operation.

In some embodiments, the wall switch is a TRIAC switch.

In some embodiments, the wall switch operation is performed by a user for operating the wall switch with a series of operation patterns within an operation time period.

In some embodiments, the series of operation patterns are a sequence of on-off operations.

In some embodiments, the series of operation patterns are a sequence of amount variation operations.

In some embodiments, the wall switch has a visible code to be scanned by a mobile phone for connecting to a configuration guideline web page.

The the guideline web page instructs a user to operate the wall switch to perform multiple input patterns to be associated with different control signals of the controller.

In some embodiments, the controller records the input patterns of the user and associates the input patterns with different control signals of the controller.

In some embodiments, the input patterns are selected by the user and memorized by the controller.

In some embodiments, the time detector has a clock shared with a wireless module coupled to the controller.

In some embodiments, the wireless module receives a setting from an external device.

The setting is transmitted to the controller to change a length of the predetermined time period.

In some embodiments, the lighting apparatus may also include a manual switch disposed on a housing containing the controller for adjusting a length of the predetermined time period.

In some embodiments, the wall switch circuit detects a type of the wall switch.

When the type of the wall switch is in a first set, the voltage time variation is adopted for determining the current ratio adjustment.

When the type of the wall switch is in a second set, the voltage time variation is ignored for determining the current ratio adjustment.

In some embodiments, the first set includes TRIAC switch.

In some embodiments, the second set includes 0-10V switch.

In some embodiments, the lighting apparatus may also include a night light source.

The first light LED module and the second LED module are activated in a first working mode, and.

The night light source is activated in a second working mode.

The night light source alternatively shares the power circuit with the first LED module and the second LED module.

In some embodiments, the voltage time variation is ignored in the second working mode.

In some embodiments, the lighting apparatus may also include an energy change circuit for lowering an overall power output of the power circuit in the second working mode.

In some embodiments, the controller switches the second working mode in an emergent case when the power circuit receives power from a battery.

In some embodiments, the wall switch is operated to activate the first LED module and the second LED module for an temporary period in the emergent case.

The time detector counts whether time has passed over the temporary period and instructs the controller to switch back to the second working mode.

DETAILED DESCRIPTION

Figure 7:
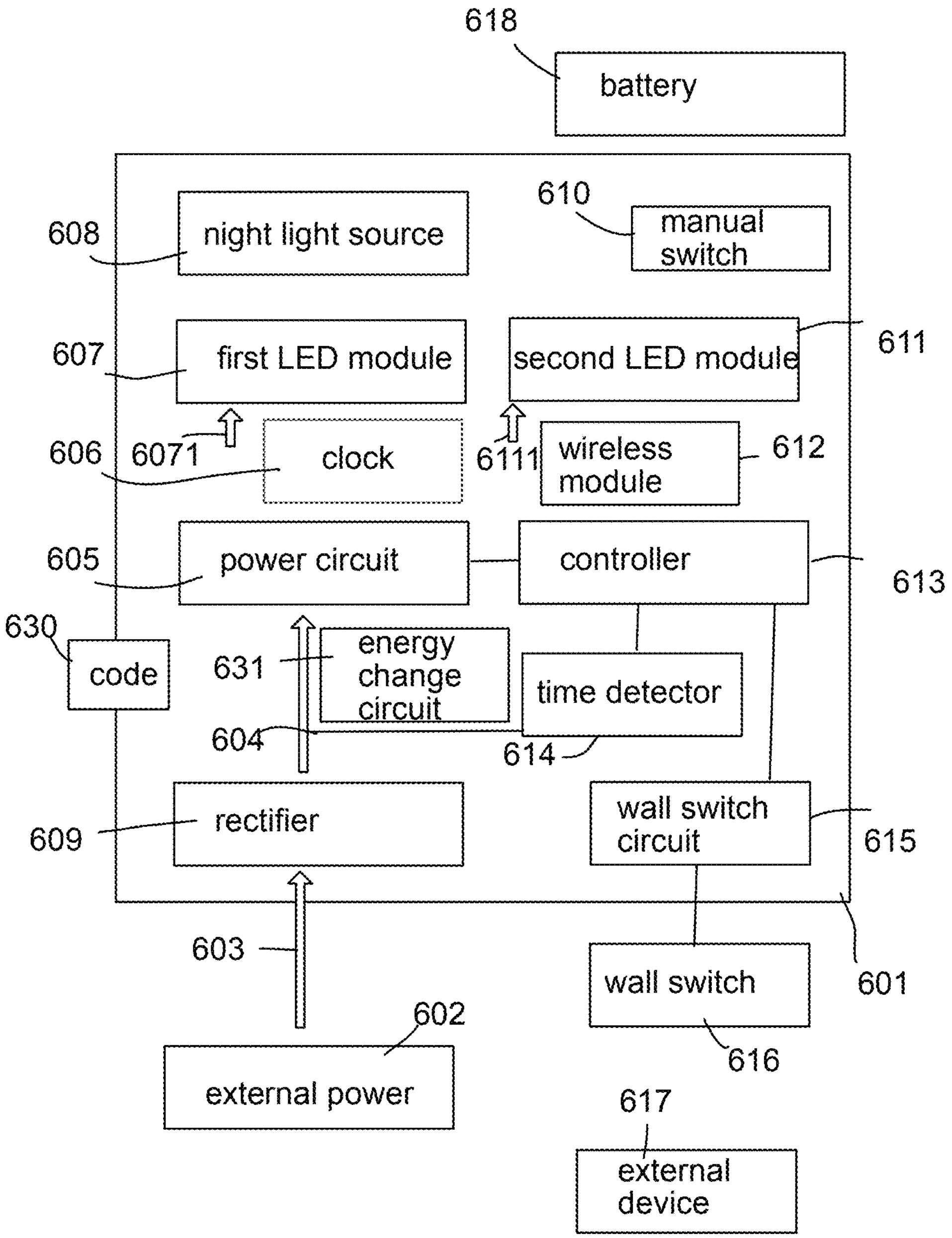
FIG. 7 illustrates another embodiment of a lighting apparatus.

In FIG. 7, a lighting apparatus includes a first LED module 607, a second LED module 611, a rectifier 609, a power circuit 605, a time detector 614, a wall switch circuit 615 and a controller 613. There is a housing 601 for holding these components.

The housing 601 is changed depending on different light device types, e.g. a downlight device, a panel light device, a spot light device and/or even a light bulb device.

The first LED module 607 has a first light parameter. The second LED module 610 has a second light parameter.

The first light parameter is different from the second light parameter, e.g. different colors, different color temperatures, different color rendering indexes.

In some other embodiments, there may be more types of LED modules. With two or more LED modules, light of required parameters may be obtained by mixing the first LED module, the second LED module and/or other additional light sources.

The rectifier 609 converts an AC power 603 to a DC power 604. The AC power 603 may be a 110V AC power. LED modules unlike traditional light sources need direct current source. Thus, the rectifier 609 may include a transformer, a filter and/or other components to generate a stable DC power.

The power circuit 605 converts the DC power 604 to a first driving current 6071 and a second driving current 6771 respectively supplied to the first LED module 607 and the second LED module 611.

The time detector 614 detects a voltage time variation of the DC power 604.

In different embodiments, the time detector 614 may be implemented with different ways. For example, the time detector 614 may be implemented as an analog circuit, which uses a capacitor with a calculated capacity to filter voltage variation within a certain time period. If the voltage variation is larger than the time period, the overflowed signal may be detected by the controller, thus making the capacitor as a time detector 614.

In some other embodiments, the time detector 614 may be made with a digital circuit. In such way, a clock with associated circuit may be used for counting time passed when detecting a voltage variation.

It is found that voltage variation may occur due to some types of wall switches but not occur in some other types of wall switches. For those wall switches that may cause voltage variation, e.g. TRIAC switch, the time detector 615 is disposed for finding such factor and provides the information to the controller 613 to prevent error judgement of color adjustment.

For example, users may just try to turn on or turn off a light, but the wall switch causes a time variation, making the controller make wrong decision to change color temperature, which may confuse the users.

The wall switch circuit 615 is selectively coupled to a wall switch 616 mounted on a wall for converting an wall switch operation of the wall switch 616 to a control signal.

The wall switch operation may vary depending on different types of wall switches. It is important and flexible if the controller may detect and adapt its operation to fit various wall switches, including traditional wall switches.

The controller 613 is coupled to the wall switch circuit 615 and the time detector 614 for determining whether to adjust a current ratio between the first driving current 6071 and the second driving current 6111 according both the voltage time variation and the control signal.

In some embodiments, if the voltage time variation is smaller than a predetermined time period, even the wall switch operation instructs a mixing adjustment to the controller, the controller ignores the wall switch operation.

In some embodiments, the wall switch is a TRIAC switch.

In some embodiments, the wall switch operation is performed by a user for operating the wall switch with a series of operation patterns within an operation time period.

In some embodiments, the series of operation patterns are a sequence of on-off operations. For example, when users press turn-on and turn-off for three times within 3 seconds may be associated to a first wall switch operation. When users press turn-on for 2 seconds and then turn-off for 1 second may be associated to a second wall switch operation. Different wall switch operations may instruct the controller 613 to do different tasks, e.g. to change color temperature, to change color and/or other things. Multiple wall switch operations may be combined as a complete operation to make the operation more flexible.

In some embodiments, the series of operation patterns are a sequence of amount variation operations. For example, to turn the light intensity rotation button to a largest level and then turn it to lowest level within 2 seconds may be associated to a first wall switch operation.

In some embodiments, the wall switch has a visible code 630 to be scanned by a mobile phone for connecting to a configuration guideline web page.

Specifically, when users want to configure the setting of the controller 613. Users may rely on the wall switch. However, the wall switch may be a simple device, e.g. an on/off switch and thus tells little information on how to operate it.

In such case, a QR code or some other codes may be provided on the surface of the wall switch so that users may scan the code 630 to access to a remote web page, which provides guidelines.

When the user operates the wall switch as indicated in the guidelines, an input pattern is recognized and recorded by the controller 613 to customize the settings as indicated by the user.

The the guideline web page instructs a user to operate the wall switch to perform multiple input patterns to be associated with different control signals of the controller.

In some embodiments, the controller records the input patterns of the user and associates the input patterns with different control signals of the controller.

In some embodiments, the input patterns are selected by the user and memorized by the controller.

In some embodiments, the time detector has a clock shared with a wireless module coupled to the controller.

In some embodiments, the wireless module receives a setting from an external device 617.

The setting is transmitted to the controller to change a length of the predetermined time period.

In some embodiments, the lighting apparatus may also include a manual switch 610 disposed on a housing containing the controller for adjusting a length of the predetermined time period. For example, the predetermined time period may have an initial value but it may cause inaccurate judgement for the controller 613. In such case, the manual switch 610, e.g. a sliding switch on the housing 601 may be disposed for users to fine-tune the predetermined time period and/or other parameters.

In some embodiments, the wall switch circuit detects a type of the wall switch.

When the type of the wall switch is in a first set, the voltage time variation is adopted for determining the current ratio adjustment.

When the type of the wall switch is in a second set, the voltage time variation is ignored for determining the current ratio adjustment.

In some embodiments, the first set includes TRIAC switch.

In some embodiments, the second set includes 0-10V switch.

In some embodiments, the lighting apparatus may also include a night light source 608.

The first light LED module 607 and the second LED module 611 are activated in a first working mode.

The night light source 608 is activated in a second working mode.

The night light source 608 alternatively shares the power circuit with the first LED module 607 and the second LED module 611.

Specifically, the night light source 608 may be used in night bed time and in such time, the first LED module 607 and the second LED module 611 are turned off completely. In the day time, the night light source 608 is turned off completely. They share the same power circuit 605 in different time or different working modes.

In some embodiments, the voltage time variation is ignored in the second working mode.

In some embodiments, the lighting apparatus may also include an energy change circuit 631 for lowering an overall power output of the power circuit in the second working mode.

In some embodiments, the controller switches the second working mode in an emergent case when the power circuit receives power from a battery 618.

In some embodiments, the wall switch is operated to activate the first LED module and the second LED module for an temporary period in the emergent case.

The time detector 614 counts whether time has passed over the temporary period and instructs the controller to switch back to the second working mode.

Figure 1:
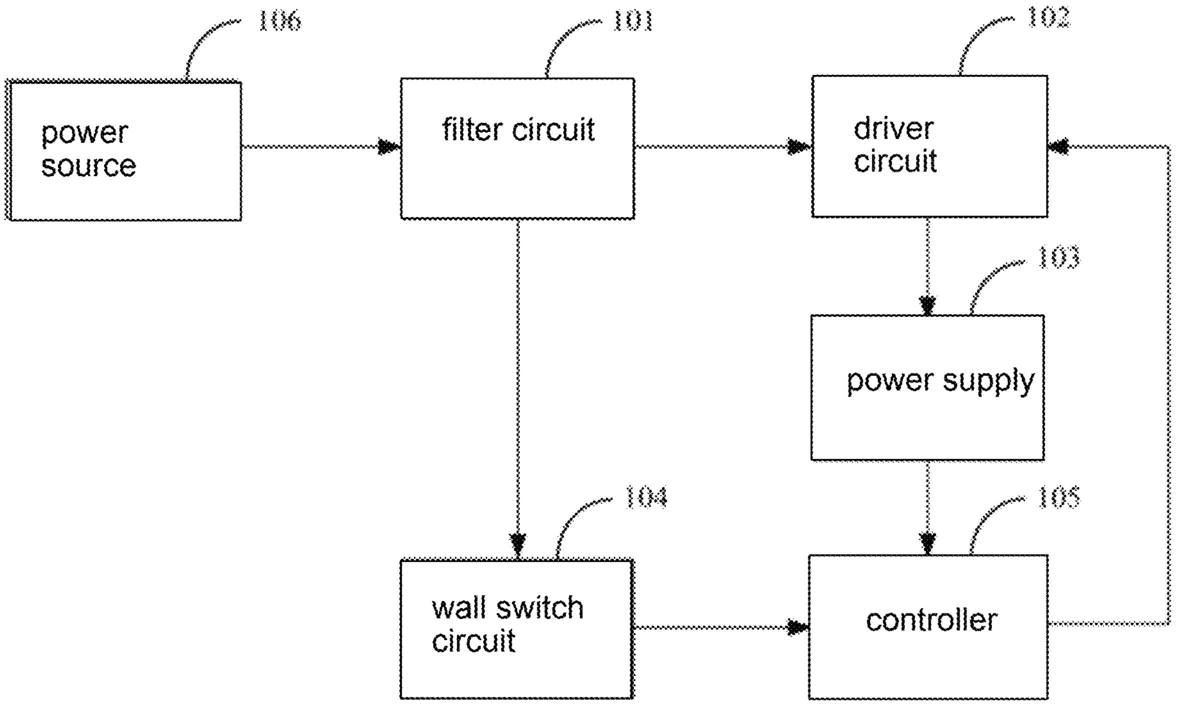
FIG. 1 illustrates a circuit diagram that illustrates a first embodiment.

Please refer to FIG. 1, which shows a circuit diagram illustrating an example to implement above invention.

In FIG. 1, there is a power source 106, a filter circuit 101, a driver circuit 102, a power supply 103, a controller 105 and a wall switch circuit 104.

The filter 101 converts an AC power to a DC power. The driver circuit 102 generates driving currents to LED modules, as mentioned above. The power supply 103 generates corresponding power for the controller 105. The controller 105 controls the driver circuit to adjust driving currents based on wall switch circuit 104 that may be integrated with a time detector mentioned above.

Figure 2:
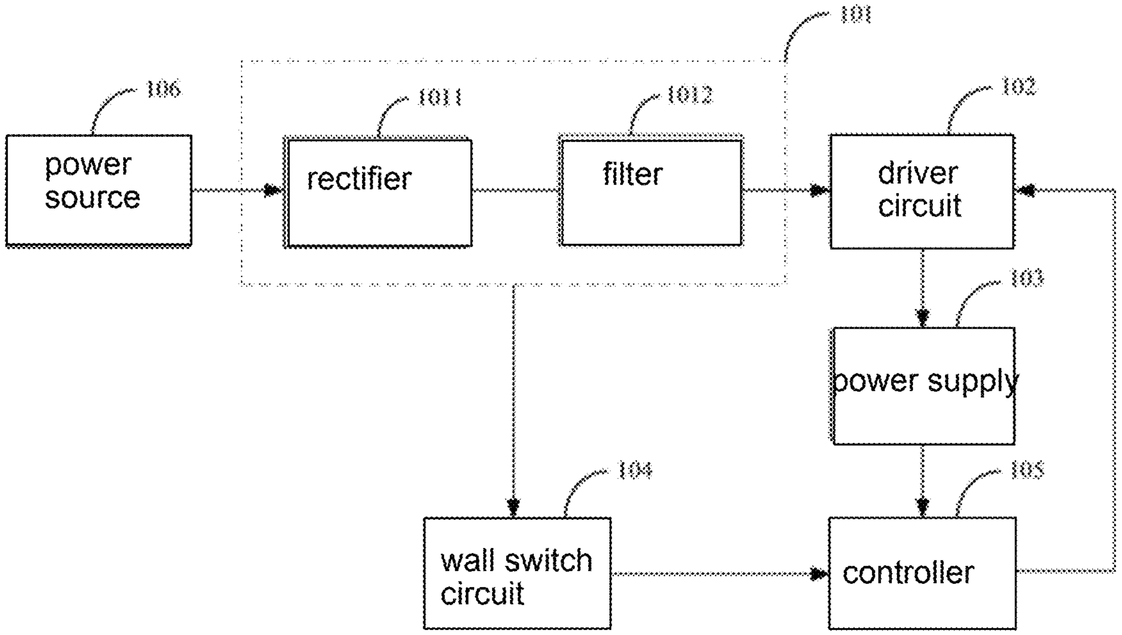
FIG. 2 illustrates a second circuit diagram to show a more detailed example of FIG. 1.

In FIG. 2, the same reference numerals refer to the same components of FIG. 1. In addition to the components mentioned above, the filter circuit 101 may include a rectifier 1011 to convert an AC power to a DC power, and a filter 1012 to make the direct current more smooth.

Figure 3:
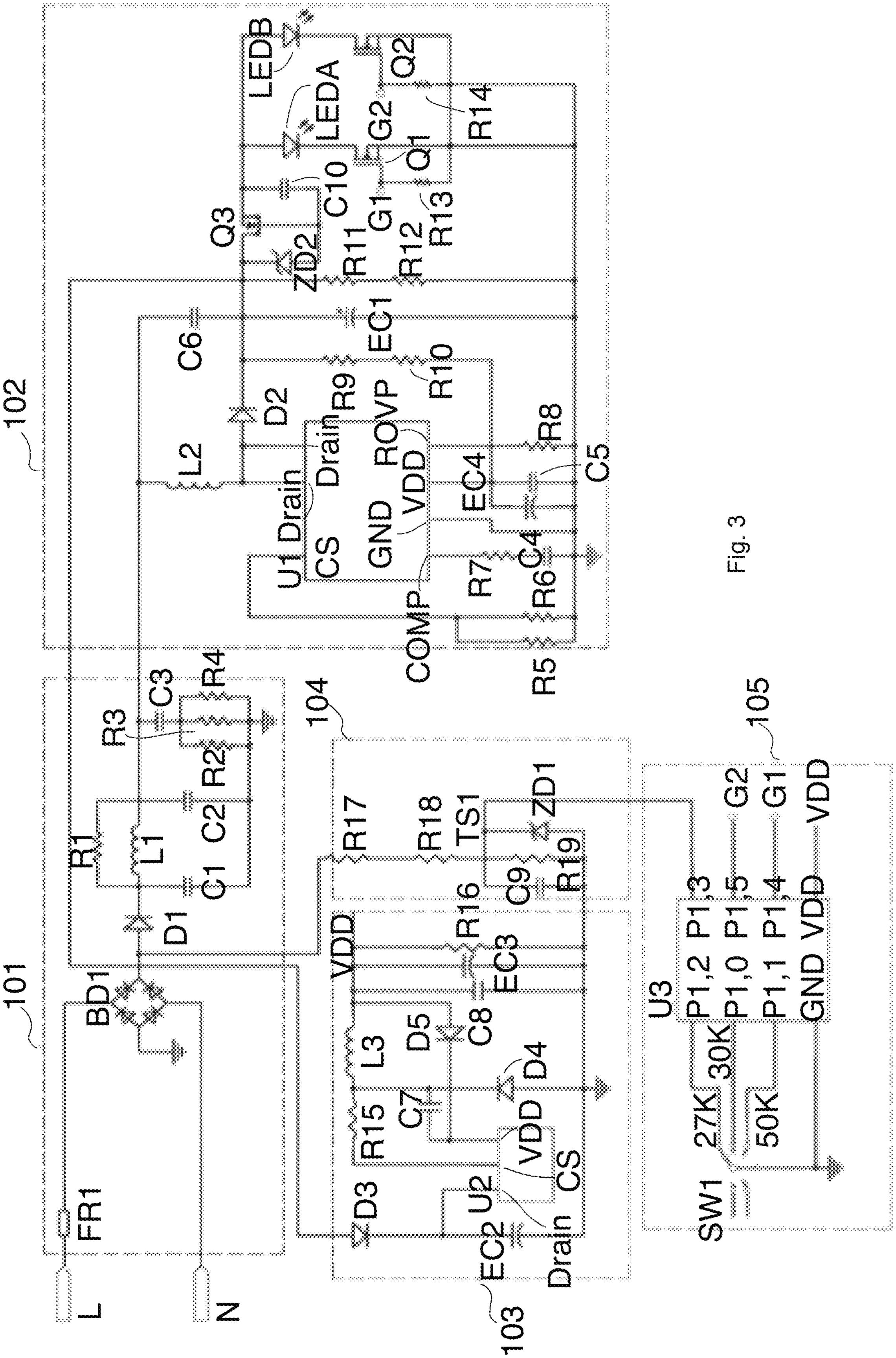
FIG. 3 illustrates a detailed circuit example to implement the control circuit in FIG. 1.

In FIG. 3, an exemplary detailed circuit diagram is provided to show a way to implement the circuit diagram in FIG. 1 and FIG. 2. The reference numerals refer to the blocks mentioned in FIG. 1 and FIG. 2.

Figure 4:
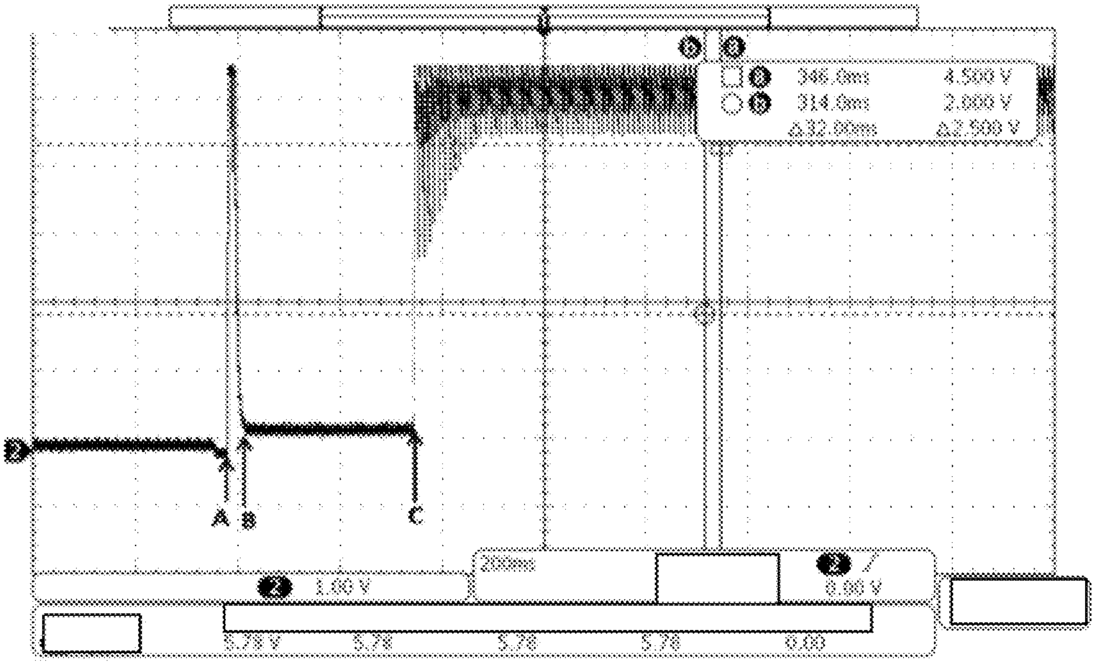
FIG. 4 illustrates a time variation diagram during control.

FIG. 4 illustrates a time variation diagram obtained during an experiment to develop this invention.

In FIG. 4, the voltage variation in point A, B, C are detected by the voltage time detector to determine whether it is an operation or just a noise caused by the wall switch.

Figure 5:
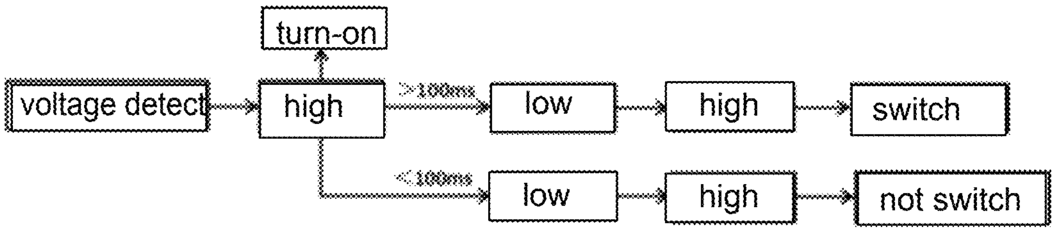
FIG. 5 illustrates a first example indicating a first scenario.

FIG. 5 shows that when the voltage changing from high to low is larger than a time period or less than a time period, different operation, like to switch color temperature adjustment or not is performed.

Figure 6:
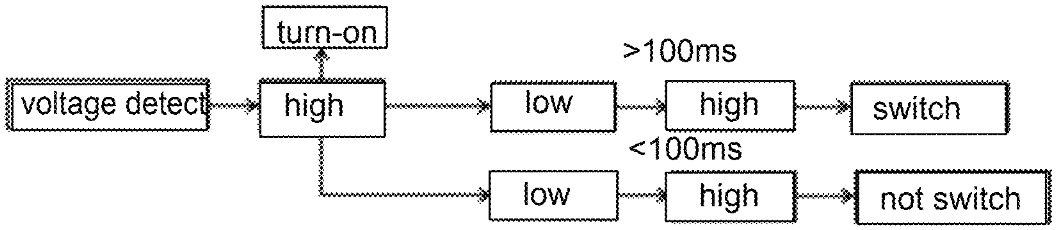
FIG. 6 illustrates a second example indicating a second scenario.

FIG. 6 shows another detection point of the voltage variation over time.

Figure 8:
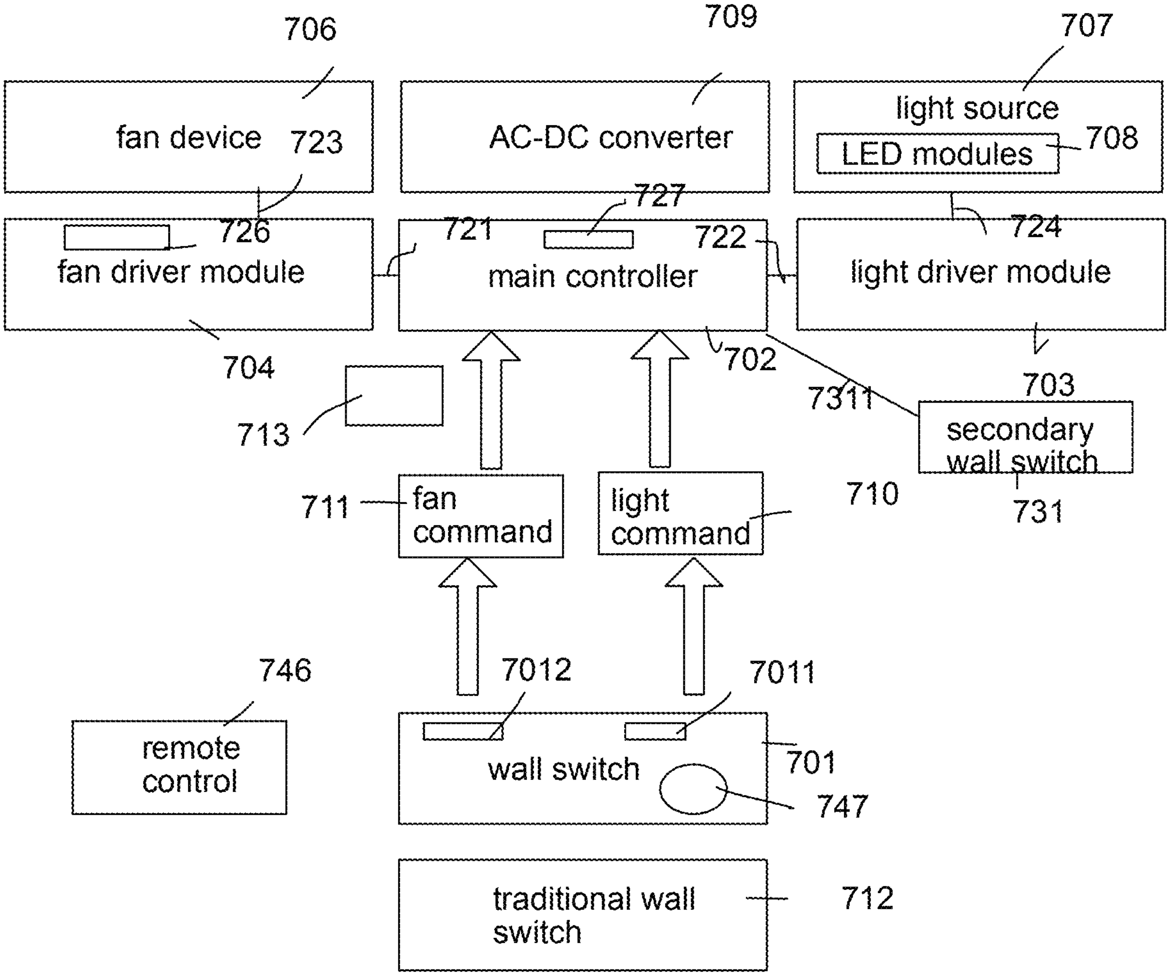
FIG. 8 illustrates another embodiment of a lighting apparatus.

In FIG. 8, a lighting apparatus includes a main controller 702, a fan driver module 704 and a light driver module 703. The lighting apparatus is coupled to a wall switch 701. The coupling between the lighting apparatus and the wall switch 701 may be wireless connected.

The wall switch 701 is operated by a user to selectively send a wireless fan command 711 and a wireless light command 710 to the main controller 702.

The main controller 702 translates the fan command 711 to a fan control signal 721 to the fan driver module 704.

The fan driver module 704 generates a fan driving current 723 to a fan device 706.

The main controller 702 translates the light command 710 to a light control signal 722 to the light driver module 707.

The light driver module 703 generates a light driving current 724 to a light source 707.

In some embodiments, the lighting apparatus may also include an AC-DC converter.

The AC-DC converter supplies power to the main controller, the fan driver module and the light driver module 709.

In some embodiments, the light source 707 includes multiple LED modules 708.

The light control signal 724 includes a ratio between sub-currents respectively supplied to the multiple LED modules 708.

The ability to mix multiple types of LED modules to achieve a desired color temperature, color, or other lighting parameters is a groundbreaking approach in modern lighting technology. By adjusting the ratios of driving currents supplied to different LED modules, this method enables precise control over the light output. This level of customization is particularly beneficial for applications where specific lighting effects or conditions are essential, such as in photography, healthcare, or architectural design.

The process works by combining LED modules that emit different colors or color temperatures. For example, warm white and cool white LEDs can be used together to produce a wide range of color temperatures, from cozy ambient lighting to crisp daylight tones. By altering the driving current ratios between these modules, the overall light color can be fine-tuned to suit specific needs, offering unparalleled flexibility compared to traditional lighting solutions.

One of the key advantages of this technique is its adaptability to different environments and purposes. Whether it's creating a calming atmosphere in a residential setting or ensuring accurate color rendering in a retail display, the ability to adjust light parameters dynamically allows for a tailored lighting experience. This adaptability also extends to energy efficiency, as the driving currents can be optimized to balance performance and power consumption.

However, achieving precise control over light parameters through mixed LED modules requires advanced electronics and control systems. The drivers and control circuits must be capable of managing different electrical characteristics of the modules and delivering variable currents with high accuracy. Additionally, ensuring seamless integration and avoiding flickering or inconsistencies in light output can pose technical challenges, particularly in complex or large-scale installations.

In conclusion, the ability to mix multiple types of LED modules by providing different ratios of driving currents is a powerful tool for creating customized lighting solutions. It combines flexibility, efficiency, and precision to meet diverse lighting needs. While the technology requires sophisticated control mechanisms and thoughtful design, its potential to revolutionize how light is used and experienced across various domains is immense.

The multiple LED modules have different parameters.

In some embodiments, the fan driver module includes a DC-DC converter.

The DC-DC converter 726 is coupled to the AC-DC converter 709 to generate the fan driving current 723.

The use of a DC-DC converter to drive a fan device offers an efficient and flexible solution for managing power delivery in systems where direct current (DC) is the primary energy source. A DC-DC converter can take an input voltage from a DC source, such as a battery or solar panel, and convert it to the appropriate voltage and current levels required by the fan. This capability ensures that the fan operates efficiently and reliably without the need for separate, dedicated power sources.

One of the main advantages of using a DC-DC converter in this application is its ability to regulate voltage and current. Fan devices typically have specific operational requirements, and deviations in input voltage can affect their performance or lifespan. The DC-DC converter ensures a stable output that matches the fan's needs, even if the input voltage fluctuates. This makes it particularly useful in systems where power sources are variable, such as renewable energy setups or mobile devices.

Another benefit of a DC-DC converter is its ability to enhance energy efficiency. By converting power with minimal losses, the converter reduces waste and maximizes the effective use of the available energy. This is especially important in battery-powered applications, where conserving energy can extend operational time and reduce the need for frequent recharging. The efficiency of modern DC-DC converters often exceeds 90%, making them ideal for powering fan devices with minimal power loss.

The flexibility offered by DC-DC converters also simplifies integration into various systems. Fans can have a wide range of voltage and power requirements depending on their size, speed, and purpose. A DC-DC converter can be tailored to deliver the specific electrical characteristics needed for each fan, allowing for the use of standardized power sources while maintaining compatibility with diverse fan models. This versatility reduces design complexity and allows for greater modularity in system architecture.

Despite its advantages, using a DC-DC converter to drive a fan device also presents challenges. The design of the converter must account for factors such as thermal management, electromagnetic interference (EMI), and reliability under continuous operation. Proper heat dissipation is essential to prevent overheating, and EMI shielding may be necessary to avoid disruptions in sensitive electronic components. Additionally, the converter must be robust enough to handle transient loads and varying fan speeds without compromising performance. Addressing these challenges is critical to ensuring that the DC-DC converter performs effectively in powering fan devices.

In some embodiments, the main controller 702 has a PWM circuit 727 for splitting a first duty ratio of a first output power to the fan device and a second duty ratio of a second output power to the light source.

A sum of the first duty rain and the second duty ratio is 100%.

In some embodiments, a main controller with a PWM (Pulse Width Modulation) circuit is utilized to manage power distribution between a fan device and a light source. The PWM circuit achieves this by splitting the total power into two distinct duty ratios: a first duty ratio for the fan device and a second duty ratio for the light source. This approach provides a precise and efficient method for allocating energy, ensuring both devices operate optimally without exceeding the power supply's limitations.

The sum of the first and second duty ratios is always maintained at 100%. This ensures that the power supply is fully utilized, with no energy wasted. For example, if the fan requires a higher duty ratio due to increased operational demand, the light source's duty ratio is automatically reduced to compensate. Conversely, when the light source requires more power for higher brightness, the fan's duty ratio is reduced. This dynamic balancing allows the system to adapt to varying operational conditions while ensuring stable performance for both devices.

One key advantage of using a PWM circuit in this context is its ability to modulate power delivery without requiring separate power sources for the fan and the light source. The PWM technique controls power by rapidly switching it on and off at a high frequency, with the duty ratio determining the proportion of time the power is on. This allows the system to efficiently share a single power source between multiple devices, reducing hardware complexity and cost.

Additionally, this method provides fine control over the performance of both the fan and the light source. The fan's speed can be adjusted smoothly based on the duty ratio, allowing for precise airflow regulation. Similarly, the light source's brightness can be controlled with high accuracy, enabling customization for various applications. This level of control is particularly beneficial in multifunctional devices where user experience and energy efficiency are critical priorities.

However, implementing such a system also presents challenges. The main controller must be equipped with a robust feedback mechanism to monitor and adjust the duty ratios dynamically based on the operational requirements of the fan and light source. Additionally, care must be taken to manage heat generation and electromagnetic interference (EMI) caused by high-frequency switching. Proper thermal design and shielding techniques are essential to ensure the long-term reliability and efficiency of the system. By addressing these challenges, a PWM-based main controller can provide a highly effective solution for powering integrated devices.

In some embodiments, a temperature sensor 713 detects an operation temperature of the light source 707.

The main controller 702 adjusts the fan control signal 721 based on the operation temperature.

In some embodiments, a temperature sensor monitors the operational temperature of the light source to ensure its performance and longevity. Light sources, particularly LEDs, can generate significant heat during operation, which can impact their efficiency, color stability, and lifespan. By detecting the temperature in real-time, the system can respond proactively to mitigate overheating, protecting the light source from potential thermal damage and maintaining optimal lighting conditions.

The main controller leverages the temperature data from the sensor to adjust the fan control signal dynamically. This enables the fan to respond proportionally to changes in the light source's temperature. For example, when the light source operates at higher temperatures, the main controller increases the fan's speed to enhance cooling. Conversely, if the temperature decreases, the controller reduces the fan speed to save energy and minimize noise. This dynamic adjustment ensures a balance between effective heat dissipation and efficient energy use.

Integrating temperature-based fan control offers several benefits, including improved system reliability, reduced maintenance requirements, and a better user experience. By maintaining the light source within a safe temperature range, the system prevents thermal stress that could lead to premature failure. Additionally, users benefit from a quieter and more energy-efficient system, as the fan only operates at higher speeds when necessary. This intelligent control mechanism represents a thoughtful design approach that enhances the overall performance and usability of the device.

In some embodiments, the wall switch 701 has a panel disposed a fan switch 7011 and a light switch 7012 respectively for generating the fan command the light command.

In some embodiments, the main controller 702 is further connected to a secondary wall switch 731 with a wire 7311.

A series of on-off operation on the secondary wall switch is encoded as the light command the fan command to the main controller.

In some embodiments, the main controller is connected to a secondary wall switch via a wire, enabling a simple and intuitive way to control multiple devices, such as a fan and a light source, using encoded on-off operations. This setup allows users to issue various commands without the need for complex interfaces or additional remote controllers. The encoding mechanism interprets specific patterns of on-off operations as distinct commands, which the main controller translates into actionable signals for the connected devices.

For instance, a quick sequence of two on-off operations within three seconds might be defined as a command to toggle the fan's speed or to activate a specific lighting mode. Another command could involve turning the switch on for one second, then quickly off and back on, which the system might interpret as a signal to adjust the light's brightness or turn the fan off. This encoding method offers a versatile and user-friendly way to interact with the system, reducing the reliance on multiple switches or complicated settings, while providing flexible control over the devices.

The implementation of such an encoding system requires careful design to ensure responsiveness and accuracy. The main controller must monitor the timing and sequence of on-off operations precisely, distinguishing between intentional commands and accidental inputs. Additionally, the system must account for variations in user input timing to accommodate natural differences in how people operate the switch. This design not only enhances usability but also adds functionality to existing wall switches, enabling them to serve as multi-purpose control interfaces for modern, integrated devices.

In some embodiments, the main controller generates an indication signal to the light control module for the light source to generate a visual signal corresponding to the fan device.

In some embodiments, when the fan control module detects an abnormal status of the fan device, the fan control module instructs the main controller to generate the indication signal.

In some embodiments, where a fan device and light source are controlled together by a main controller, the system is designed to provide clear and intuitive feedback through a visual signal generated by the light source. When the main controller receives or generates an indication signal, it instructs the light control module to activate the light source in a way that visually corresponds to the fan device's status. For example, the light source might blink, change color, or adjust brightness to signal the fan's operational state, such as normal operation, speed level, or a detected abnormality. This integration simplifies monitoring for users, making it easy to assess the system's status at a glance.

In cases where the fan control module detects an abnormal status in the fan device, it informs the main controller, which then triggers the visual indication signal. Abnormal statuses might include issues such as blocked fan blades, overheating, or a motor malfunction. The light source's response, such as a specific blinking pattern or a change to a distinct warning color, alerts users to the issue immediately. This proactive approach helps ensure that users are quickly informed of potential problems, enabling timely intervention to address the issue before it escalates, thereby improving system reliability and safety.

This cohesive interaction between the fan device, light source, and main controller highlights the advantages of integrated device management. By leveraging the light source as a visual communication tool, the system eliminates the need for separate indicator displays or audible alarms, reducing complexity and cost. The design is user-friendly and accessible, ensuring that feedback is clear even in noisy or visually cluttered environments. This integration not only enhances functionality but also contributes to a seamless and efficient user experience, reflecting thoughtful engineering and design.

Figure 9:
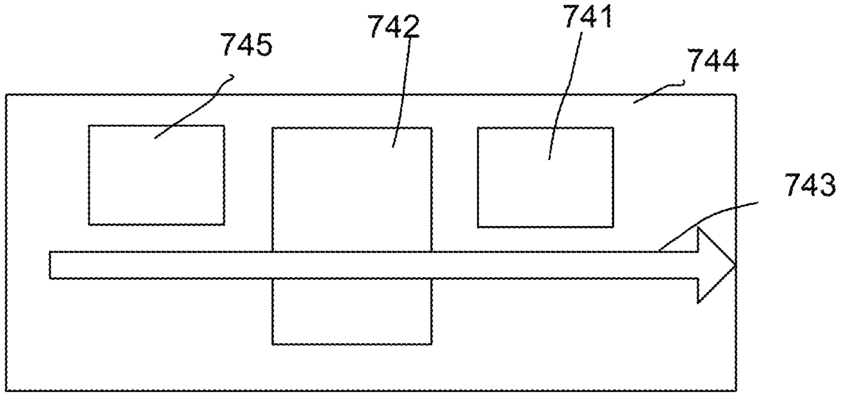
FIG. 9 shows another lighting apparatus embodiment.

In FIG. 9, the fan device is configured to form an air flow tunnel 744.

In some embodiments, an ultraviolet light source 741 is disposed in the air flow tunnel 744 to disinfect air 743 in the air flow tunnel 744.

In FIG. 9, the fan device is strategically designed to form an air flow tunnel, creating a directed passage for air to flow through. This air flow tunnel serves as a controlled environment where specific interventions can be applied to the moving air. By channeling the air through this tunnel, the system not only ensures efficient airflow but also creates an opportunity to integrate additional functionalities, such as air disinfection. The streamlined design of the tunnel helps optimize airflow, maintaining consistent speed and direction, which is crucial for effective interaction with any embedded components, such as an ultraviolet (UV) light source.

In some embodiments, an ultraviolet light source is integrated into the air flow tunnel to disinfect the air as it passes through. UV light, particularly in the UV-C spectrum, is highly effective in neutralizing airborne pathogens, including bacteria and viruses. As air flows through the tunnel, it is exposed to the UV light, which disrupts the DNA or RNA of microorganisms, rendering them inactive. This setup transforms the fan device into a dual-purpose system, providing both ventilation and air purification. The placement of the UV light within the air flow tunnel ensures that the light's disinfection capabilities are concentrated on the moving air, maximizing its effectiveness.

The combination of the fan and UV light source offers significant benefits for indoor air quality, particularly in environments where clean air is essential, such as healthcare facilities, offices, or homes. However, this integration also presents challenges, such as ensuring the UV light is shielded from direct exposure to humans, as prolonged UV-C exposure can be harmful. Proper shielding, along with careful control of the light's intensity and operational timing, is critical to maintaining safety. Additionally, the airflow must be optimized to allow sufficient exposure time to the UV light for effective disinfection. When designed correctly, this integrated system exemplifies a sophisticated approach to enhancing air quality through innovative and multifunctional devices.

In FIG. 9, a heater 745 is disposed in the air flow tunnel 744 to heat the air.

In FIG. 9, the inclusion of a heater within the air flow tunnel transforms the fan device into a multifunctional system capable of heating air as it moves through the tunnel. This heater is strategically placed to ensure that the airflow is uniformly exposed to the heat, resulting in a consistent and controlled increase in air temperature. The heated air can then be distributed efficiently to the surrounding environment, making this setup ideal for applications where both ventilation and heating are required. By integrating the heater into the air flow tunnel, the system combines functionality with compact design, reducing the need for separate heating and airflow devices.

The heater's placement within the air flow tunnel leverages the airflow generated by the fan to enhance the distribution of warmth. As the fan directs air through the tunnel, the heater applies its thermal energy to the moving air, ensuring even heating. This method eliminates potential hotspots or uneven warming, which can occur with standalone heating devices. The combination of airflow and heating makes the system particularly suitable for spaces that require rapid temperature adjustments or consistent climate control, such as offices, bedrooms, or small commercial areas.

Using a heater in the air flow tunnel also presents certain challenges that must be addressed for optimal performance and safety. The design must ensure that the heater does not obstruct the airflow, as reduced airflow could compromise the fan's efficiency and the system's ability to heat effectively. Additionally, the heater must include safety mechanisms, such as temperature sensors and automatic shutoff features, to prevent overheating or fire hazards. Proper thermal management and integration with the main controller are essential to ensure that the heating element operates efficiently and safely within the air flow tunnel. With these considerations, the combined functionality of heating and ventilation creates a versatile and user-friendly system.

In FIG. 8, a remote control 746 sends a second fan command a second light command to the main controller 702.

In some embodiments, the remote control and the wall switch use different wireless protocols.

In FIG. 8, the remote control is configured to send a second fan command and a second light command to the main controller. This allows users to control the fan and light source wirelessly, providing a convenient and flexible interface for operating the devices. By enabling remote communication, the system ensures that users can easily manage their environment without needing direct access to the main controller or wall switch. This functionality is particularly useful in larger spaces or in situations where physical access to the controller is limited.

In some embodiments, the remote control and the wall switch communicate with the main controller using different wireless protocols. For instance, the remote control might use a high-range protocol like Wi-Fi, while the wall switch employs a low-energy protocol such as Zigbee or Bluetooth. Using different protocols enhances the system's robustness by reducing the likelihood of interference between devices and ensuring seamless operation across a range of use cases. The diversity in communication methods also provides flexibility, allowing the system to cater to various connectivity needs, such as long-range remote access or low-power local operation.

This multi-protocol approach contributes to the system's overall reliability and adaptability. By leveraging different wireless technologies, the system can maintain functionality even if one protocol encounters connectivity issues. For example, if the Wi-Fi network experiences interference, the wall switch can still operate independently using its dedicated protocol. Additionally, the use of different protocols enables the system to integrate with a broader range of devices and smart home ecosystems, enhancing its compatibility and future-proofing its design. This layered communication strategy not only improves the user experience but also adds resilience to the system, ensuring consistent performance in diverse environments.

In some embodiments, the wall switch has a rotation base 747 for rotating a transmitter to align with the direction of the main controller.

In some embodiments, the wall switch includes a rotation base that allows the transmitter to be rotated and aligned with the main controller. This feature ensures that the transmitter's signal is directed optimally toward the main controller, enhancing communication reliability and performance. For systems that use directional signal technologies, such as infrared (IR), proper alignment is crucial. Misaligned signals may weaken communication or cause intermittent operation, especially in environments with obstacles or reflective surfaces.

For infrared-based systems, aligning the transmitter is particularly important because IR signals require a clear line of sight to perform effectively. The rotation base allows users to manually adjust the transmitter's orientation, ensuring the signal path is unobstructed. This adjustment can significantly improve performance, especially in rooms with complex layouts or furniture that could otherwise block the signal. By providing a way to fine-tune the transmitter's position, the rotation base ensures stable and efficient operation of the system.

The inclusion of a rotation base also adds flexibility to the installation and operation of the wall switch. It allows the switch to function reliably in various environments, regardless of the placement of the main controller. Whether the controller is mounted on a wall, ceiling, or hidden behind a piece of furniture, the rotation base helps the transmitter maintain proper alignment. This adaptability improves the user experience by reducing the need for precise pre-installation planning and ensuring consistent communication performance in diverse setups.

In some embodiments, the wall switch is attached on a traditional wall switch 712.

The wall switch 701 gets power from the traditional wall switch 712.

In some embodiments, the wall switch is designed to be attached to a traditional wall switch, leveraging the infrastructure already present in many homes and buildings. Traditional wall switches are typically hardwired to the building's electrical system, drawing power directly from the main supply. By attaching the new wall switch to this existing setup, the system avoids the need for additional wiring, reducing installation complexity and costs. This method also allows for seamless integration with existing electrical systems, making it easier to upgrade or retrofit without extensive modifications.

The wall switch gets power directly from the traditional wall switch, using it as an energy source. This coupling is achieved by connecting to the traditional switch's electrical terminals, ensuring a stable power supply to operate the advanced functionalities of the wall switch. This design eliminates the need for batteries or separate power sources, which not only reduces maintenance but also ensures continuous operation. By utilizing the traditional wall switch as a power source, the system benefits from the reliability of a wired connection, making it more dependable than battery-powered alternatives.

This approach offers several advantages, particularly in reducing the need for disruptive installations. Instead of routing new wires through walls or digging holes for new electrical lines, the advanced wall switch can simply be mounted onto the existing traditional switch. This significantly minimizes labor and material costs, making the upgrade process more accessible and appealing to users. Additionally, this design ensures compatibility with standard electrical configurations, allowing users to enjoy modern smart-switch functionalities without completely overhauling their existing infrastructure. This balance of innovation and practicality is a key feature of this embodiment.

In some embodiments, the traditional wall switch is connected to the main controller with a wire.

In some embodiments, the traditional wall switch only controls the light source.

In some embodiments, the traditional wall switch is connected directly to the main controller using a wire, providing a reliable fallback control mechanism for the lighting apparatus. This connection ensures that even if the attached wall switch, which may include advanced or wireless functionalities, becomes damaged or non-operational, the traditional wall switch can still maintain basic control over the light source. This design adds a layer of redundancy, ensuring that critical functions like lighting remain accessible under all circumstances, enhancing the reliability and robustness of the system.

In some embodiments, the traditional wall switch is dedicated solely to controlling the light source. By limiting its scope to the light source, the traditional wall switch serves as a simple yet effective backup mechanism for essential lighting control. This ensures that even in the absence of the advanced wall switch, users can perform basic operations such as turning the lights on or off, preserving the core functionality of the system. This separation of roles minimizes the complexity of the traditional switch, making it more reliable and easier to use during critical situations.

This duplicate design, where the traditional wall switch serves as a backup, provides a safety net for the lighting apparatus, ensuring its controllability even when advanced systems fail. This approach is particularly valuable in scenarios where uninterrupted lighting is crucial, such as during emergencies or power fluctuations. By maintaining a wired connection between the traditional switch and the main controller, the system guarantees consistent performance and minimizes the risk of complete operational failure. This thoughtful redundancy highlights the importance of integrating simplicity and reliability into advanced control systems.

In some embodiments, the light command and the fan command are encoded with an identifier after the wall switch is matched with main controller.

In some embodiments, the light command and fan command are encoded with an identifier to ensure they are directed to the correct device after the wall switch is paired with the main controller. This identifier acts as a unique key that links specific wall switches to their corresponding main controllers and devices, preventing accidental interference or control of unintended devices. This approach is particularly important in environments where multiple systems are operating in close proximity, such as multi-room homes, offices, or apartment complexes.

One situation where this is critical is in shared spaces, such as offices or multi-family housing. In such settings, several wall switches and controllers may exist within range of each other, potentially leading to cross-communication. Without an identifier, a light command intended for one room might accidentally control a light in a neighboring space. By encoding the commands with a unique identifier, the system ensures that only the matched main controller recognizes and executes the commands, maintaining privacy and functionality.

Another scenario involves smart homes where users have multiple devices in the same room, such as ceiling fans, table lamps, and wall-mounted lights. If these devices are controlled by different main controllers, there is a risk of overlapping signals. Identifiers eliminate this risk by ensuring that the wall switch sends commands only to its paired controller, enabling seamless and interference-free operation of multiple devices in the same environment. This also simplifies the user experience by ensuring that each switch reliably controls its assigned devices.

In commercial or industrial applications, the need for unique identifiers becomes even more pronounced. For example, in a warehouse or factory, numerous fans and lighting systems may operate simultaneously to manage airflow and illumination. If commands from one switch unintentionally affect devices in another section, it could disrupt workflows or create safety hazards. The use of encoded identifiers ensures precise control, allowing different sections to operate independently without interference, while maintaining efficient coordination within the system.

Finally, identifiers also play a key role in maintaining security within the system. Wireless communication can be susceptible to unauthorized access or accidental control from unpaired devices. Encoding commands with identifiers ensures that only paired and authenticated devices can execute the commands, reducing the risk of external interference or accidental activation. This design not only improves usability but also enhances the system's robustness and reliability in diverse operational environments.

Figure 10:
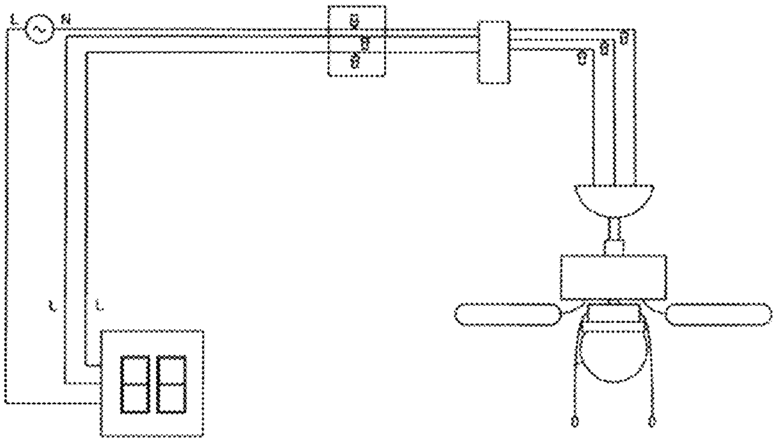
FIG. 10 is a schematic structural diagram of a lamp-fan.

In one embodiment, referring to FIG. 10, the lighting lamp and the fan in a lamp-fan device are typically controlled separately using two switches on a wall switch. The setup requires two sets of power lines (L line and N line). During installation, an additional L line (while sharing the N line) must be added from the ceiling lamp-fan device to the wall switch.

In the embodiment of this utility model, both the lighting lamp and the fan are powered by the AC-DC module. Only one set of power lines is required. The lighting lamp and fan are not directly controlled by the wall switch. Instead, the wall switch sends the first switch action signal to the main control module 15*b* via wireless communication. The main control module 15*b* then controls the lighting lamp and fan separately. This circuit structure is simple, requires only one set of power lines, is easy to wire, and reduces both installation and material costs.

Figure 11:
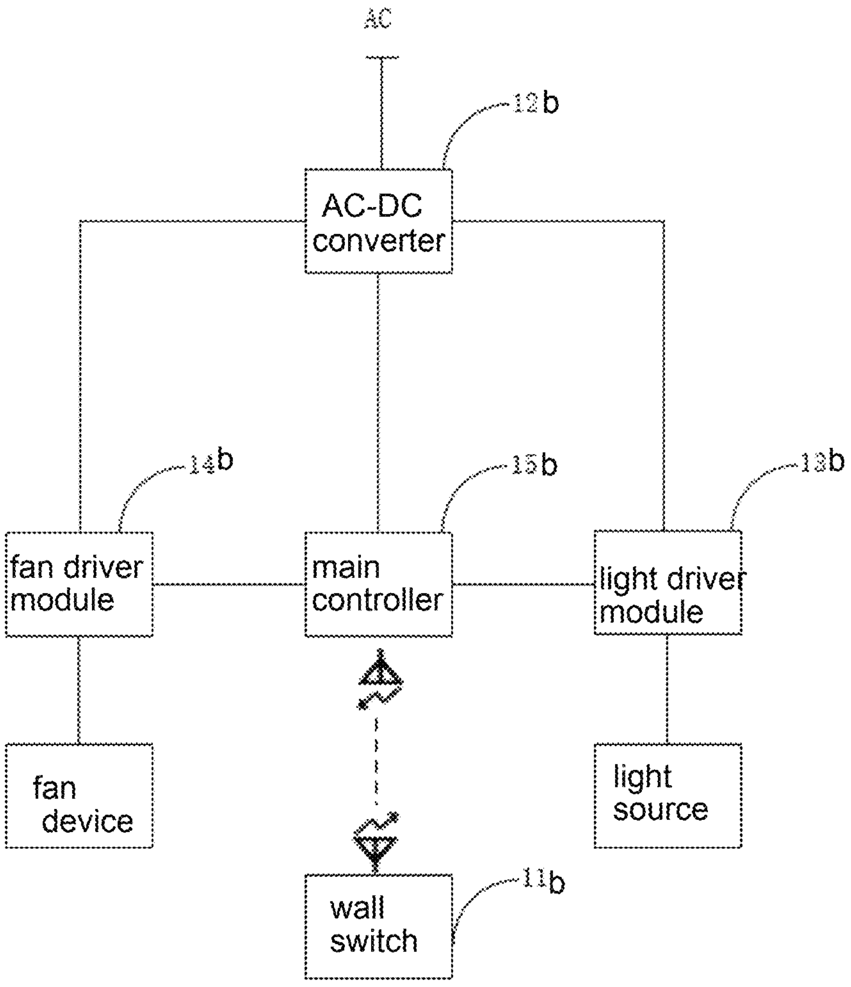
FIG. 11 is a schematic circuit diagram of a lamp-fan control circuit provided in an embodiment of this utility model.

FIG. 11 shows a structural schematic of a lamp-fan control circuit provided in this utility model embodiment. Referring to FIG. 11, this lamp-fan control circuit includes: wall switch 11*b*, AC-DC module 12*b*, lamp driving module 13*b*, fan driving module 14*b*, and main control module 15*b*.

The input terminal of the AC-DC module 12*b* is connected to the AC power supply. The output terminal of AC-DC module 12*b* is connected to the power terminals of the main control module 15*b*, lamp driving module 13*b*, and fan driving module 14*b*. This setup supplies power to the main control module 15*b*, lamp driving module 13*b*, and fan driving module 14*b*.

The input terminal of the main control module 15*b* is wirelessly connected to the wall switch 11*b*. The first signal output terminal of the main control module 15*b* is connected to the control terminal of the lamp driving module 13*b*. The second signal output terminal of the main control module 15*b* is connected to the control terminal of the fan driving module 14*b*.

The output terminal of the fan driving module 14*b* is used to drive the fan to rotate. The output terminal of the lamp driving module 13*b* is used to light up the lighting lamp.

The wall switch 11*b* is used to obtain the first switch action signal from the user and send this signal to the main control module 15*b* via wireless communication. The main control module 15*b* receives the first switch action signal and sends a lamp control signal to the lamp driving module 13*b* or a fan control signal to the fan driving module 14*b*.

Referring to FIG. 11, in this embodiment, the lamp driving module 13*b* and the fan driving module 14*b* are both powered by the AC-DC module 12*b*. The input terminal of the AC-DC module 12*b* is connected to the AC power supply (L line and N line). The wall switch 11*b* is wirelessly connected to the main control module 15*b*. When the wall switch 11*b* is pressed, a first switch action signal is generated. The main control module 15*b*, based on this signal, controls the lighting lamp or the fan by managing the lamp driving module 13*b* or fan driving module 14*b*, respectively.

For example, when the lamp switch 111*b* on the wall switch 11*b* is pressed, the main control module 15*b* receives the first switch action signal. It analyzes and confirms the signal as a lamp-on command. The main control module 15*b* then sends a lamp driving signal to the lamp driving module 13*b*, which in turn controls the lighting lamp to light up.

In this embodiment, the lighting lamp and fan are powered through a single set of power lines. The wall switch 11*b* does not directly control the power supply to the lighting lamp and fan but does so through the main control module 15*b*. This design reduces circuit complexity, eliminates the need for dual power lines, simplifies wiring, and lowers both wiring and material costs.

Figure 12:
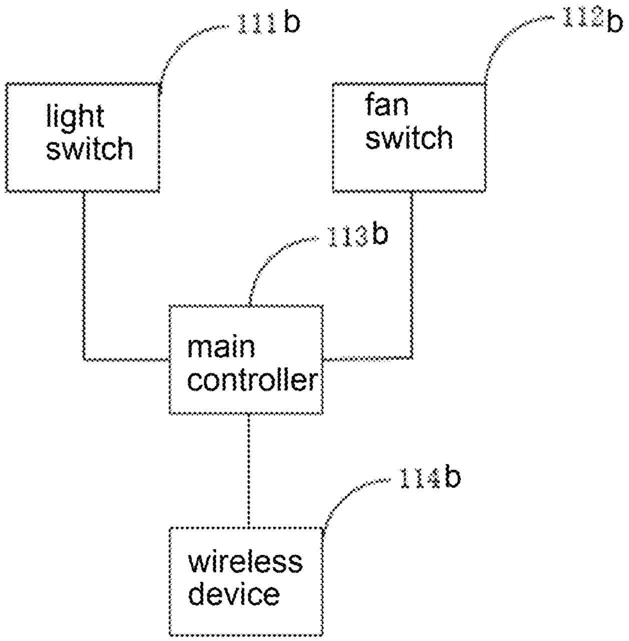
FIG. 12 is a schematic circuit diagram of a wall switch provided in an embodiment of this utility model.

In one possible embodiment, referring to FIG. 12, the wall switch 11*b* can include the following components: a lamp switch 111*b*, a fan switch 112*b*, a main control chip 113*b*, and a first wireless communication unit 114*b*.

The first input terminal of the main control chip 113*b* is connected to the lamp switch 111*b*, and the second input terminal is connected to the fan switch 112*b*. The first output terminal of the main control chip 113*b* is connected to the first wireless communication unit 114*b*.

In this utility model embodiment, the wall switch 11*b* includes a lamp switch 111*b* and a fan switch 112*b*. The first switch action signal comprises a lamp switch action signal and a fan switch action signal, which are used to control the lighting lamp and fan, respectively. Both switches communicate with the main control module 15*b* via the first wireless communication unit 114*b*. This ensures that the main control module 15*b* receives the lamp switch action signal or fan switch action signal as needed.

For example, the wall switch 11*b* can be mounted on a wall. The lamp switch 111*b* and fan switch 112*b* can take the form of button switches, rocker switches, or touch switches. These switches have only two states and are designed solely to control the on/off state of the lamp or the fan.

Alternatively, the lamp switch 111*b* and fan switch 112*b* can be rotary switches. Rotary switches have multiple continuous states, allowing control over the brightness of the lighting lamp and the speed of the fan. The main control chip 113*b* detects the positional information of the rotary switch and sends this data to the main control module 15*b*. Based on this information, the main control module 15*b* adjusts the brightness of the lighting lamp via the lamp driving module 13*b* or the fan speed via the fan driving module 14*b*.

More specifically, the fan driving module 14*b* can include a DC-DC unit and a three-phase motor driving unit.

The input terminal of the DC-DC unit is connected to the power supply terminal of the fan driving module 14*b*. The output terminal of the DC-DC unit is connected to the power supply terminal of the three-phase motor driving unit.

The control terminal of the three-phase motor driving unit is connected to the control terminal of the fan driving module 14*b*. The three-phase output terminal of the three-phase motor driving unit outputs three-phase AC power to drive the fan motor.

The main control module 15*b* sends a fan control signal to the three-phase motor driving unit based on the action signal from the fan switch 112*b*. The three-phase motor driving unit converts DC power into three-phase power (U, V, W) to drive the fan's three-phase motor. For instance, if the fan switch 112*b* is a rocker switch, when the rocker switch is pressed, the fan switch 112*b* generates an action signal indicating the first state, which commands the fan to start. The main control module 15*b* then controls the fan to rotate at a preset speed via the fan driving module 14*b*. When the rocker switch is pressed again, the fan switch 112*b* generates an action signal indicating the second state, instructing the fan to stop. The main control module 15*b* stops the fan via the fan driving module 14*b*.

Alternatively, if the fan switch 112*b* is a rotary switch, rotating the switch causes the main control chip 113*b* to send the position information of the fan switch 112*b* to the main control module 15*b*. The main control module 15*b* determines the fan's rotational speed based on the position information of the fan switch 112*b* and adjusts the output power of the three-phase motor driving unit to control the fan's rotation speed. When the rotary switch is turned back to its initial position, the fan stops.

In the above embodiments, the fan driving module 14*b* is used to drive a three-phase electric fan. When the fan driving module 14*b* is used to drive a single-phase electric fan, the fan driving module 14*b* may include a DC-DC unit and a single-phase motor driving unit.

The input terminal of the DC-DC unit supplies power to the single-phase motor driving unit. The control terminal of the single-phase motor driving unit receives control signals sent by the main control module 15*b*.

The single-phase motor driving unit can be an AC single-phase driving unit, which may control motor speed or on/off operation through a triac or a relay. The specific implementation follows conventional technical methods and is not elaborated on here.

The control of the lighting lamp follows a similar principle. For example, the lamp driving module 13*b* may adopt a BUCK architecture, a flyback architecture, or a linear constant-current architecture.

For instance, if the lamp switch 111*b* is a rotary switch, turning the rotary switch allows the main control module 15*b* to control the output current of the lamp driving module 13*b* based on the positional information of the lamp switch 111*b*. This controls the lighting lamp to achieve the corresponding brightness level.

The architecture of the lamp driving module 13*b* is not limited to the mentioned examples. It may include, but is not restricted to, BUCK, flyback, or linear constant-current architectures. These architectures are standard in the field, and their specific principles are not further detailed here.

The control logic of the main control module 15*b* and the main control chip 113*b* also includes, but is not limited to, the aforementioned examples. The control logic follows established technologies and is not within the scope of protection for this utility model embodiment. Therefore, specific implementations are not defined here.

It is worth mentioning that the main control module 15*b* may be equipped with a wireless communication module to communicate with the first wireless communication unit 114*b*. The main control module 15*b* may consist of a control chip (e.g., a microcontroller), a wireless communication module, and peripheral circuits.

Figure 13:
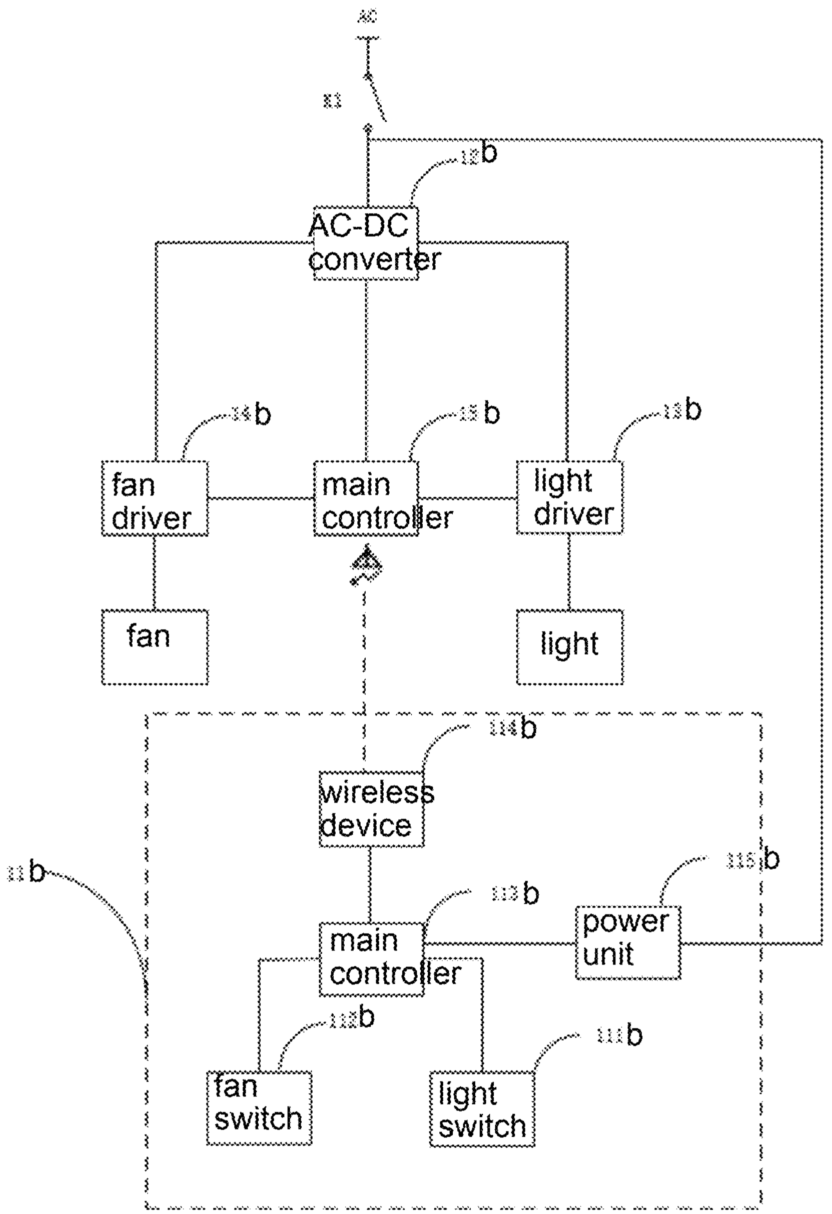
FIG. 13 is another schematic circuit diagram of a lamp-fan control circuit provided in an embodiment of this utility model.

In one possible embodiment, referring to FIG. 13, the wall switch 11*b* may also include an AC controllable switch K1*b*.

The AC controllable switch K1*b* is placed between the input terminal of the AC-DC module 12*b* and the AC power source.

In this embodiment, the wall switch 11*b* may also include an AC controllable switch K1*b*, which can be placed on the same switch panel as the lamp switch 111*b* and fan switch 112*b*. The AC controllable switch K1*b* is connected in series between the AC-DC module 12*b* and the AC power supply through a wire and is used to control the power supply of the AC power source.

For example, the AC controllable switch K1*b* may be a push-button switch. When the push-button switch is pressed, the input terminal of the AC-DC module 12*b* is connected to the AC power supply. When the push-button switch is pressed again, it resets, cutting off the total power supply to the lamp-fan system.

By including the AC controllable switch K1*b* in this embodiment, the power supply of the AC power source can be controlled, improving the convenience and safety of the lamp-fan system.

In one possible embodiment, the wall switch 11*b* may also include a battery. The battery is connected to the power terminal of the main control chip 113*b*.

In this embodiment, the wall switch 11*b* can be powered by the battery. Since the wall switch 11*b* is mounted on a wall, and AC power lines are routed through the wall, another possible implementation is shown in FIG. 13. The wall switch 11*b* may include a power supply unit 115*b*.

The input terminal of the power supply unit 115*b* is connected to the input terminal of the AC-DC module 12*b*, and the output terminal of the power supply unit 115*b* is connected to the power terminal of the main control chip 113*b*.

The input terminal of the power supply unit 115*b* is connected to the AC power supply via the AC-DC module 12*b*. This means that the AC power supply provides power to the main control chip 113*b* through the power supply unit 115*b*. As a result, there is no need for a battery, eliminating the requirement for battery replacement and thereby reducing maintenance difficulties.

In one possible embodiment, the lamp-fan control circuit may also include a remote control. The remote control is wirelessly connected to the input terminal of the main control module 15*b*.

The main control module 15*b* is further configured to receive the second switch action signal sent by the remote control.

In this embodiment, a remote control may be provided. The remote control communicates wirelessly with the main control module 15*b*, allowing the main control module 15*b* to obtain the second switch action signal. Based on this signal, the main control module 15*b* controls the lighting lamp or the fan.

The remote control and the wall switch 11*b* operate in parallel control. When the lamp switch 111*b* on the wall switch 11*b* is pressed, the state of the lamp switch 111*b* is toggled. The remote control can also toggle the state of the lamp switch 111*b*. If the user wishes to toggle the state again, they can press the lamp switch 111*b* on the wall switch 11*b*.

In one possible embodiment, the AC-DC module 12*b* may include a filtering unit and a rectification unit. The input terminal of the filtering unit is connected to the input terminal of the AC-DC module 12*b*. The output terminal of the filtering unit is connected to the input terminal of the rectification unit. The output terminal of the rectification unit is connected to the output terminal of the AC-DC module 12*b*.

Corresponding to the above lamp-fan control circuit, this utility model embodiment also provides a lamp-fan device, which includes a lighting lamp, a fan, and the lamp-fan control circuit as described in the above embodiments. The lamp-fan control circuit is used to drive the lighting lamp to light up and/or to drive the fan to rotate.

The lamp-fan device includes the lamp-fan control circuit described in the above embodiments and inherits the advantages of this circuit. These specific advantages are not repeated here.

The integration of wall switches with main control modules through wireless communication opens up opportunities for streamlined and versatile device control. In addition to traditional lamp and fan devices, the same architecture can support a variety of appliances, such as air purifiers, humidifiers, and smart blinds. By extending the control logic of the main controller to accommodate these devices, the system becomes a universal solution for managing multiple home functions with minimal wiring complexity.

One variation of this system could involve the use of a multi-function wall switch that includes additional buttons or rotary dials for controlling new device categories. For example, a dedicated button for an air purifier or a dimmer knob for adjustable smart lighting can be integrated into the wall switch. The first wireless communication unit within the wall switch would encode and transmit these additional commands to the main controller, which can identify and execute the appropriate device-specific actions.

Incorporating different types of wireless protocols into the system enhances its adaptability and robustness. For instance, while the wall switch may use low-power Bluetooth for short-range communication, the remote control could leverage Wi-Fi for longer-range operations. Additionally, Zigbee or LoRa protocols can be employed for environments requiring low-power, wide-area networking. These protocols ensure that the system is flexible enough to cater to various scenarios, from compact apartments to sprawling industrial settings.

To improve user convenience, the system can include voice-controlled modules that interface with the main controller. For example, commands such as "turn on the fan at medium speed" or "dim the lights to 50%" could be captured by a voice assistant and relayed to the main controller. This functionality eliminates the need for physical switches in some situations, further simplifying the user experience.

The design can also accommodate adaptive learning algorithms to predict user preferences. For example, the main controller could analyze usage patterns to automatically adjust fan speed and light brightness at specific times of the day. Such predictive behavior would enhance energy efficiency and create a more intuitive user experience. For instance, the system might gradually dim lights and reduce fan speed in the evening to promote relaxation.

Safety features can also be enhanced in this framework. For example, the main controller could monitor the current consumption of connected devices to detect anomalies, such as a jammed fan motor or a short circuit in the lighting module. Upon detecting an issue, the system could cut off power to the affected device and send an alert to the user via the remote control or a connected smartphone app.

An interesting variation is the use of solar-powered wall switches. These switches could integrate small photovoltaic cells to eliminate the need for wired power or batteries, drawing energy from ambient light. This would further reduce installation costs and maintenance, making the system even more environmentally friendly.

The system could also include modular device control units that allow users to customize their setups. For example, a modular fan control unit could offer options for integrating additional fan features, such as oscillation or ionization. Similarly, a lighting control module could support advanced features like color temperature adjustment or dynamic lighting effects for enhanced ambiance.

To improve scalability, the main controller can support multiple wall switches and remote controls, each assigned to different zones or rooms. This zoning capability enables precise control over complex setups in large buildings. For example, one wall switch could control ceiling lights and fans in the living room, while another could manage devices in the bedroom. The main controller would intelligently segregate commands based on unique identifiers, ensuring seamless operation.

Lastly, the system could support remote monitoring and diagnostics through a dedicated mobile application. Users could check the operational status of their devices, receive notifications about maintenance requirements, and even configure device schedules remotely. This capability would make the system more user-friendly and ensure that it remains operational with minimal manual intervention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus coupled to a wall switch, comprising:

a main controller, wherein the wall switch is operated by a user to selectively send a wireless fan command or a wireless light command to the main controller;

a fan driver module, wherein the main controller translates the fan command to a fan control signal to the fan driver module, wherein the fan driver module generates a fan driving current to a fan device;

a light driver module, wherein the main controller translates the light command to a light control signal to the light driver module, wherein the light driver module generates a light driving current to a light source, wherein the main controller has a PWM circuit for splitting a first duty ratio of a first output power to the fan device and a second duty ratio of a second output power to the light source, wherein a sum of the first duty rain and the second duty ratio is 100%.

2. The lighting apparatus of claim 1, further comprising a AC-DC converter, wherein the AC-DC converter supplies power to the main controller, the fan driver module and the light driver module.

3. The lighting apparatus of claim 2, wherein the light source comprises multiple LED modules, wherein the light control signal comprises a ratio between sub-currents respectively supplied to the multiple LED modules, wherein the multiple LED modules have different parameters.

4. The lighting apparatus of claim 2, wherein the fan driver module comprises a DC-DC converter, wherein the DC-DC converter is coupled to the AC-DC converter to generate the fan driving current.

5. The lighting apparatus of claim 1, wherein a temperature sensor detects an operation temperature of the light source, wherein the main controller adjusts the fan control signal based on the operation temperature.

6. The lighting apparatus of claim 1, wherein the wall switch has a panel disposed a fan switch and a light switch respectively for generating the fan command the light command.

7. The lighting apparatus of claim 6, wherein the main controller is further connected to a secondary wall switch with a wire, wherein a series of on-off operation on the secondary wall switch is encoded as the light command the fan command to the main controller.

8. The lighting apparatus of claim 1, wherein the main controller generates an indication signal to the light control module for the light source to generate a visual signal corresponding to the fan device.

9. The lighting apparatus of claim 8, wherein when the fan control module detects an abnormal status of the fan device, the fan control module instructs the main controller to generate the indication signal.

10. The lighting apparatus of claim 1, wherein the fan device is configured to form an air flow tunnel.

11. The lighting apparatus of claim 10, wherein a ultraviolet light source is disposed in the air flow tunnel to disinfect air in the air flow tunnel.

12. The lighting apparatus of claim 10, wherein a heater is disposed in the air flow tunnel to heat the air.

13. The lighting apparatus of claim 1, wherein a remote control sends a second fan command a second light command to the main controller.

14. The lighting apparatus of claim 13, wherein the remote control and the wall switch use different wireless protocols.

15. The lighting apparatus of claim 1, wherein the wall switch has a rotation base for rotating a transmitter to align with the direction of the main controller.

16. The lighting apparatus of claim 1, wherein the wall switch is attached on a traditional wall switch, wherein the wall switch gets power from the traditional wall switch.

17. The lighting apparatus of claim 16, wherein the traditional wall switch is connected to the main controller with a wire.

18. The lighting apparatus of claim 17, wherein the traditional wall switch only controls the light source.

19. The lighting apparatus of claim 1, wherein the light command the fan command is encoded with an identifier after the wall switch is matched with main controller.

* * * * *